United States Patent [19]
Kim et al.

[11] Patent Number: 5,579,175
[45] Date of Patent: Nov. 26, 1996

[54] ACTUATOR FOR OPTICAL EQUIPMENT CAPABLE OF REDUCING THE NUMBER OF COILS TO NECESSARY TO MOVE AN OBJECTIVE LENS IN A TRACKING DIRECTION AND A FOCUSING DIRECTION

[75] Inventors: Chun-dong Kim, Suwon; Hak-hyun Jang, Sungnam, both of Rep. of Korea

[73] Assignee: Samsung Electronics Co., Ltd., Kyungki-Do, Rep. of Korea

[21] Appl. No.: 390,472

[22] Filed: Feb. 17, 1995

[30] Foreign Application Priority Data

Feb. 18, 1994 [KR] Rep. of Korea .................. 94-2950

[51] Int. Cl.⁶ .................................................. G02B 7/02
[52] U.S. Cl. .......................... 359/814; 359/813; 359/823; 359/824
[58] Field of Search .................... 359/813, 814, 359/823, 824; 369/44.14, 44.15, 44.16

[56] References Cited

U.S. PATENT DOCUMENTS

| | | | |
|---|---|---|---|
| 4,557,564 | 12/1985 | van Rosmalen | 350/247 |
| 4,702,555 | 10/1987 | Iguma | 359/814 |
| 4,767,187 | 8/1988 | Gijzen | 350/247 |
| 5,046,820 | 9/1991 | Saekusa | 359/814 |
| 5,177,640 | 1/1993 | Grassens | 359/814 |

FOREIGN PATENT DOCUMENTS

| | | | |
|---|---|---|---|
| 263347 | 12/1985 | Japan | 369/44.14 |
| 14331 | 1/1987 | Japan | 369/44.14 |

Primary Examiner—Georgia Y. Epps
Assistant Examiner—Ricky Mack
Attorney, Agent, or Firm—Sughrue, Mion, Zinn, Macpeak & Seas

[57] ABSTRACT

An actuator for an optical unit moves an objective lens in a tracking direction and/or in a focusing direction of a storage medium, such as a disk. A lens holder has recesses in two surfaces opposing each other and being parallel to a photo axis of the objective lens. Elastic rods are supported by a fixed support member and couple the lens holder to the support member. A plurality of fixed coils are fixedly wound about the surfaces of the lens holder parallel or substantially parallel to the photo axis of the objective lens, in such a manner that individual axes of the wound coils forms two acute angles with respect to the photo axis of the objective lens. A magnetic field generation member generates a magnetic field influencing a portion of the plurality of the fixed coils spaced from the lens holder by the recesses. The objective lens moves in a direction designated by the current or currents flowing through the plurality of fixed coils. Thus, the winding structures of the coils for tracking and focusing the objective lens or the optical pickup are improved.

20 Claims, 5 Drawing Sheets

ACTUATOR FOR OPTICAL EQUIPMENT CAPABLE OF REDUCING THE NUMBER OF COILS TO NECESSARY TO MOVE AN OBJECTIVE LENS IN A TRACKING DIRECTION AND A FOCUSING DIRECTION

BACKGROUND OF THE INVENTION

1. Field of the Invention

The present invention relates to an actuator, in particular, an actuator for use in a focusing and tracking control apparatus in optical equipment, such as a compact disk player (CDP), laser disk player (LDP) or the like. The actuator operates to transfer, in a focusing direction or a tracking direction, an optical pickup of the optical equipment, which reads information stored on a disk.

2. Description of the Related Art

FIGS. 1A and 1B show winding structures of a focusing coil and a tracking coil in a conventional actuator. In particular, FIGS. 1A and 1B show winding structures of the coil wound around the optical pickup (not shown). As shown in FIG. 1A, focusing coil A', for transferring the optical pickup in a focusing direction, is wound about the sides of the optical pickup, and tracking coils B', for transferring the optical pickup in a tracking direction, are attached to the sides of focusing coil A'. Specifically, tracking coils B' are attached to either or both sides of focusing coils A', in such a manner that planes formed by the winding structure of each tracking coil B' are perpendicular to a direction of a magnetic field.

In FIG. 1B, a plane formed by focusing coils A' is parallel to a direction of the magnetic field, and planes formed by tracking coils B' extend along the axial direction of the magnetic field. Focusing coils A' are wound in the same manner as shown in FIG. 1A, while two kinds of tracking coils B' are wound in such a manner that they cross each other in a plane perpendicular to the direction of the magnetic field.

Various coil winding structures, such as those shown in FIGS. 1A and 1B, are known, and processes for fixing the coils to the optical pickup are often complicated. Further, a member which supports the optical pickup usually contains a spring device or the like, which imposes a large force on the actuator to facilitate movement of the actuator.

U.S. Pat. No. 5,177,640 to Grassens entitled "Two-Axis Moving Coil Actuator" discloses an actuator having tracking and focusing coils in a lens holder. The lens holder is disposed so as to be in a magnetic field generated by two pairs of permanent magnets. The tracking coil encloses the lens holder, and two focusing coils are fixed to the tracking coils adjacent to the permanent magnet pairs.

SUMMARY OF THE INVENTION

The present invention simplifies the processes for fixing the coils to the optical pickup, and reduces the loading force needed in the member which supports the optical pickup. Specifically, it is an object of the present invention to provide an actuator for an optical unit by arranging tracking coils and focusing coils in formats different from those of U.S. Pat. No. 5,177,640.

To achieve this object, the present invention provides an actuator for an optical unit comprising a base plate, a support member fixed to the base plate, and a lens holder in which an objective lens is installed. The lens holder has a recess in each of its two surfaces which are parallel or substantially parallel to a photo axis of the objective lens and oppose each other.

Elastic rods, for supporting the objective lens with respect to the support member, are arranged to allow the objective lens to move in a tracking direction and a focusing direction. A plurality of fixed coils for moving the lens holder in a selected direction are fixedly wound about the surfaces of the lens holder parallel or substantially parallel to the photo axis of the objective lens in such a manner that different axes of the wound coils form two acute angles with respect to the photo axis of the objective lens and the surfaces of the lens holder having the recesses. A magnetic filed generator generates magnetic fields which interlink the portions of the plurality of the fixed coils which are spaced from the lens holder by the recesses.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

A preferred embodiment of the present invention is described in detail below with reference to the accompanying drawings.

Figure 1A:
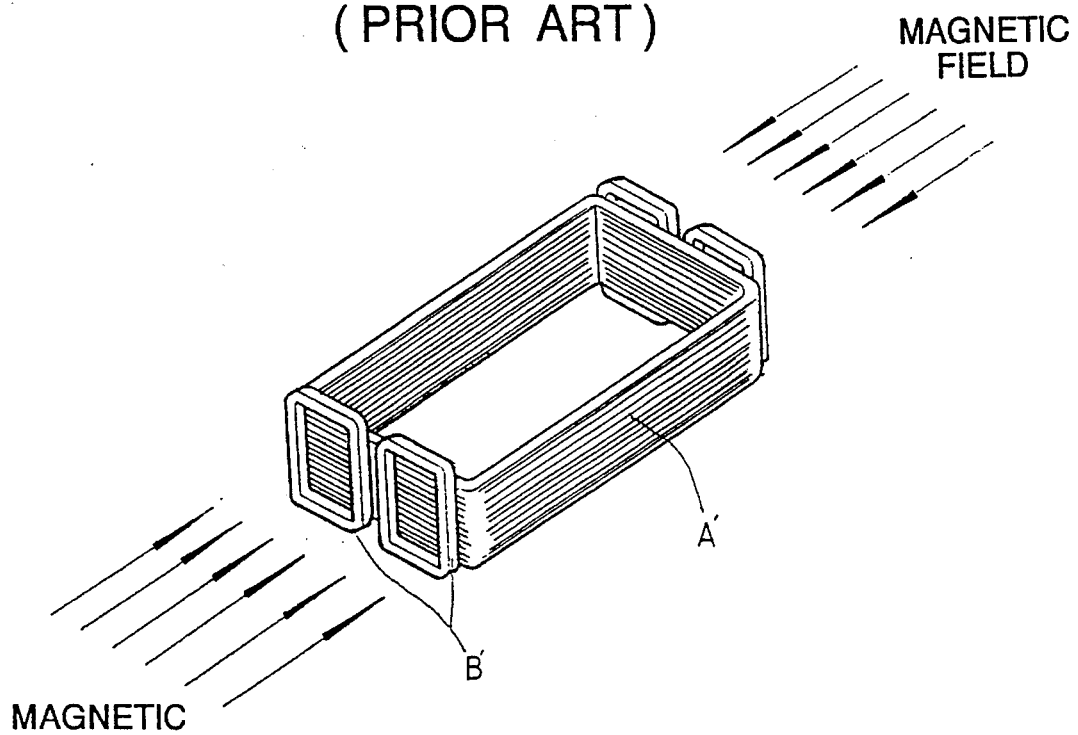
FIGS. 1A and 1B show winding structures of focusing coils and tracking coils of a conventional actuator.
Figure 1B:
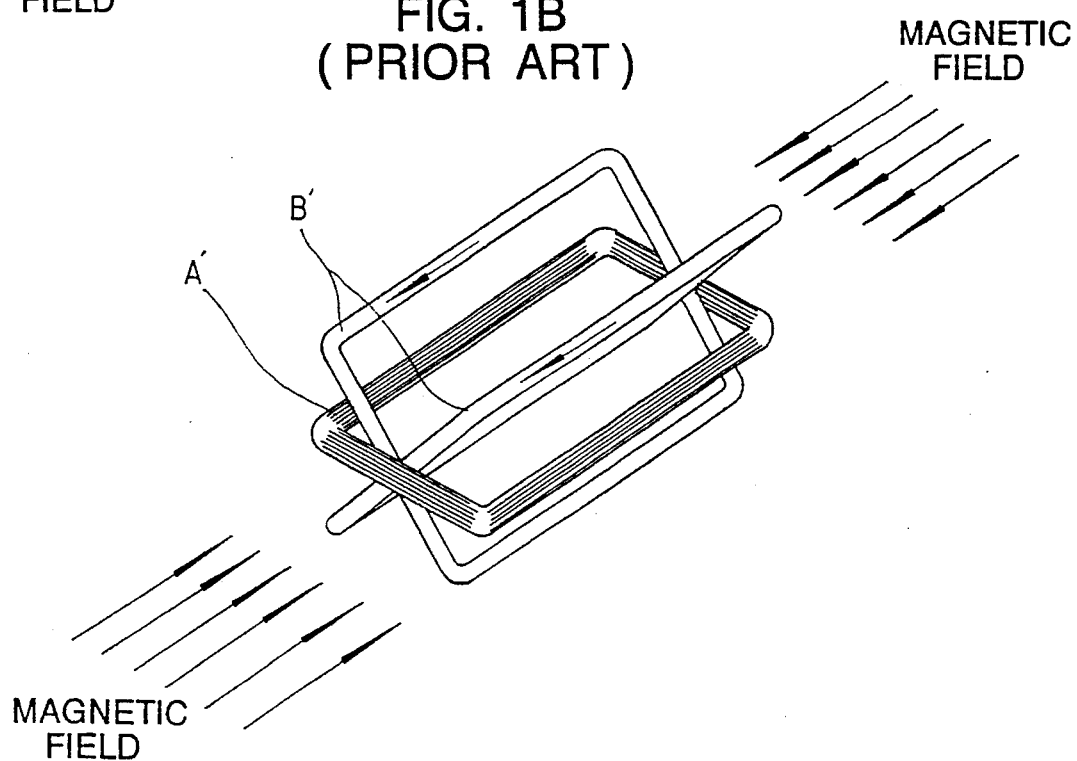
Figure 2A:
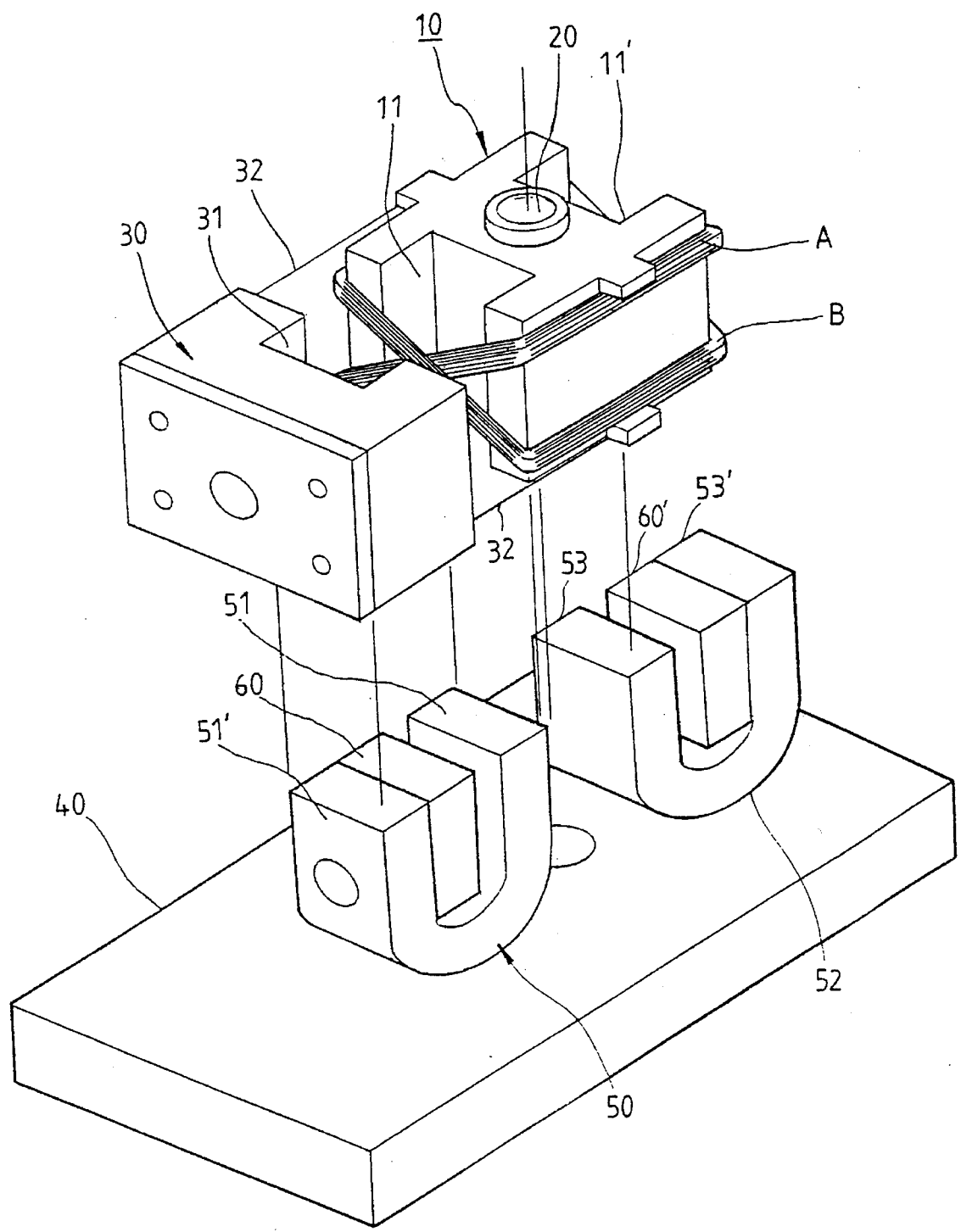
FIGS. 2A is a separate perspective view of an actuator for an optical unit according to an embodiment of the present invention.

FIG. 2A is a perspective view of an actuator for an optical unit according to one embodiment of the present invention. As shown, an objective lens 20 is mounted at the center of the upper surface of a lens holder 10. Lens holder 10 is supported by four elastic rods 32 fixed to a support member 30 so as to stand freely.

Support member 30 is fixed to a base plate 40. Each of four elastic rods 32 is individually fixed to one of four corners of support member 30, which has the shape of a hexahedron. Lens holder 10 has insertion recesses 11 and 11' in its surface facing the support member 30 and in its opposite surface.

Two pairs of coils A and B are wound around the outer surface of lens holder 10. The two pairs of coils A and B cross to each other in the periphery of each of insertion recesses 11 and 11'.

A U-shaped yoke 50 comprises an inner yoke portion 51 close to lens holder 10 and an outer yoke portion 51' further away from lens holder 10. A permanent magnet 60 is attached to the inner side surface of outer yoke portion 51'. Another U-shaped yoke 52 comprises an inner yoke portion 53 close to lens holder 10, and an outer yoke portion 53' further away from lens holder 10. A permanent magnet 60' is attached to the inner side surface of outer yoke portion 53'.

Figure 2B:
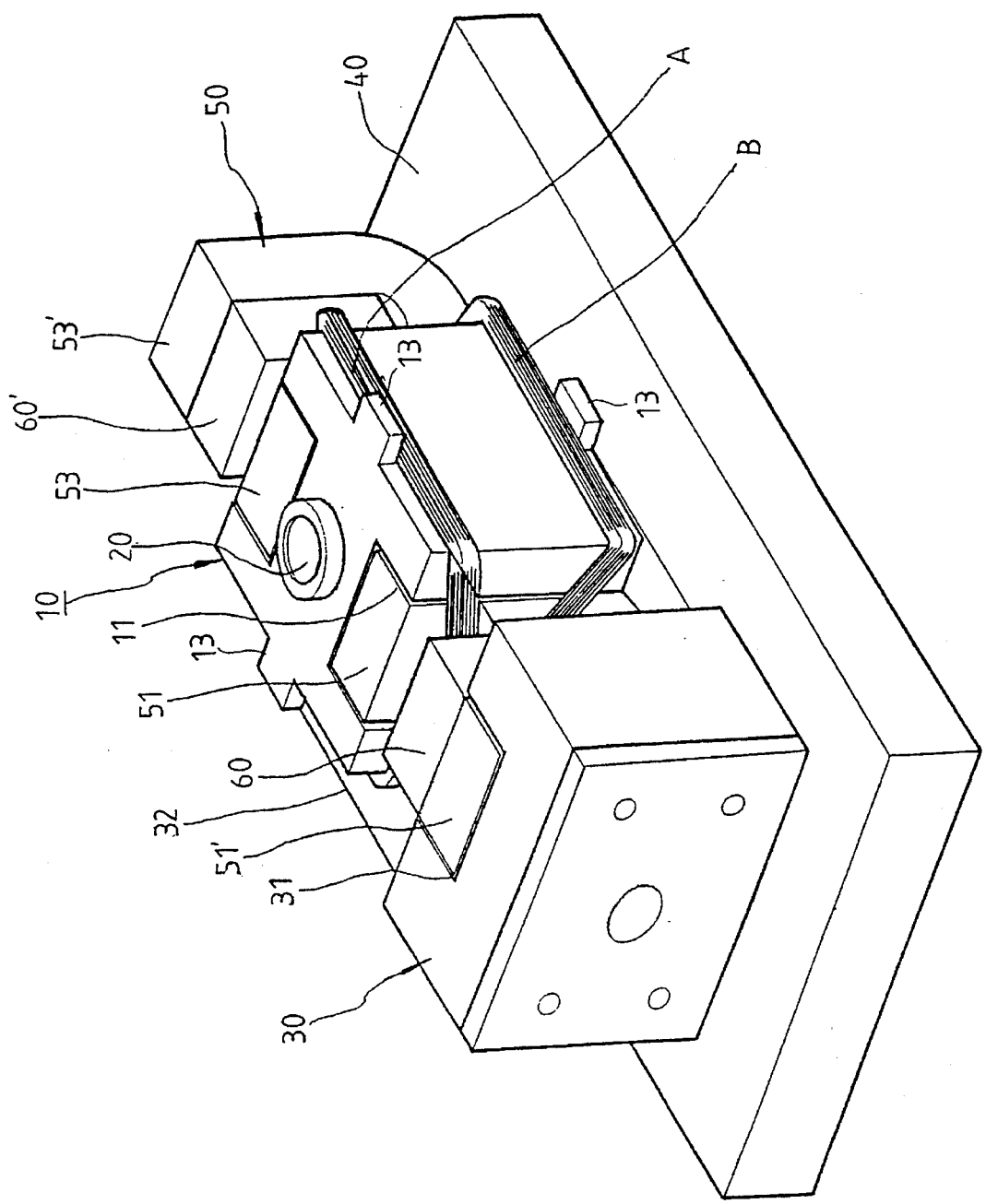
FIG. 2B is a perspective view showing an assembled state of the apparatus shown in FIG. 2A.

FIG. 2B is a perspective view showing an assembled state of the apparatus shown in FIG. 2A. As shown, lens holder 10 is inserted into yokes 50 and 52. Outer yoke portion 51' is fixedly inserted into insertion recess 31 formed in the side surface of support member 30, while inner yoke portion 53 is fixedly inserted into insertion recess 11' formed in lens holder 10. The optical actuator constructed as shown in FIG. 2B generates magnetic fields as shown in FIG. 3.

Figure 3:
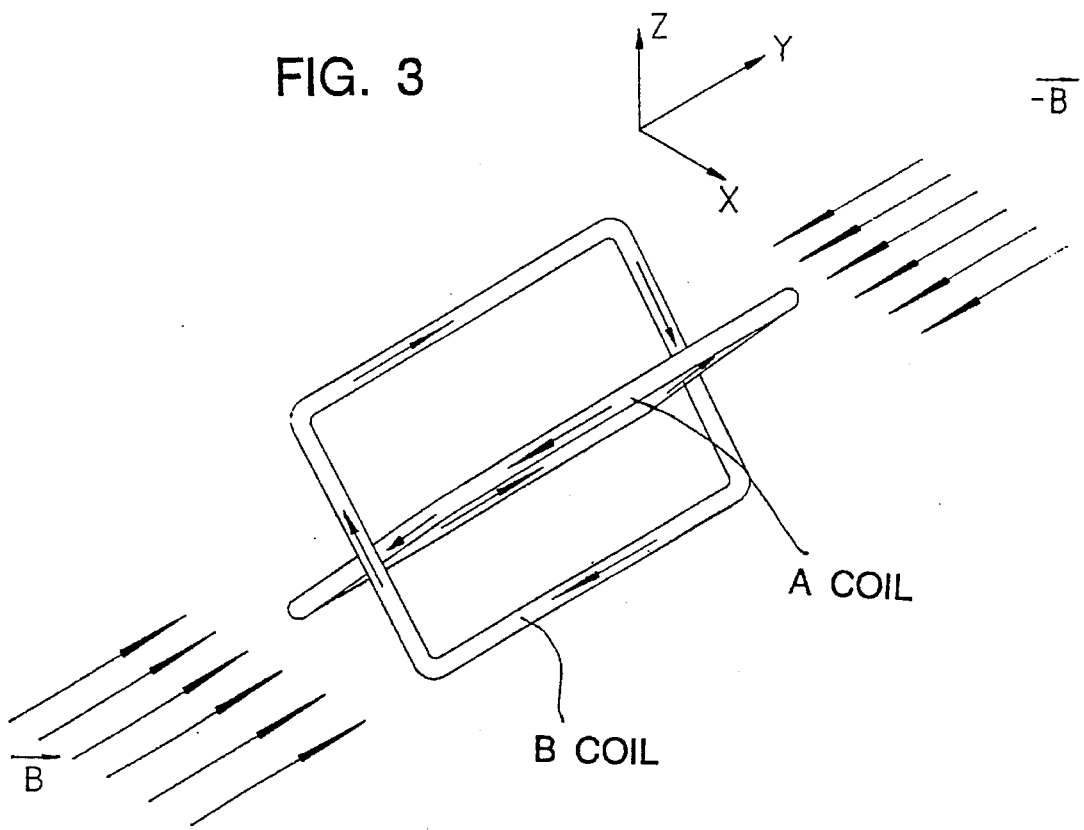
FIG. 3 shows a winding structure of coils which are located in a magnetic field and magnetic fields having an opposing direction to each other, as in the embodiment of the present invention shown in FIGS. 2A and 2B.

In FIG. 3, a Z-axis represents a focusing direction, an X-axis represents a tracking direction, and a Y-axis represents a magnetic field direction. Magnetic field B is generated in a space between permanent magnet 60 and inner yoke 51, and magnetic field −B is generated in a space between permanent magnet 60' and inner yoke 53. Magnetic fields B and −B are vectors having opposing directions. The force created by these magnetic fields, which are generated by current flowing through coils A and B, move lens holder 10 in a tracking direction and/or a focusing direction.

Figure 4:
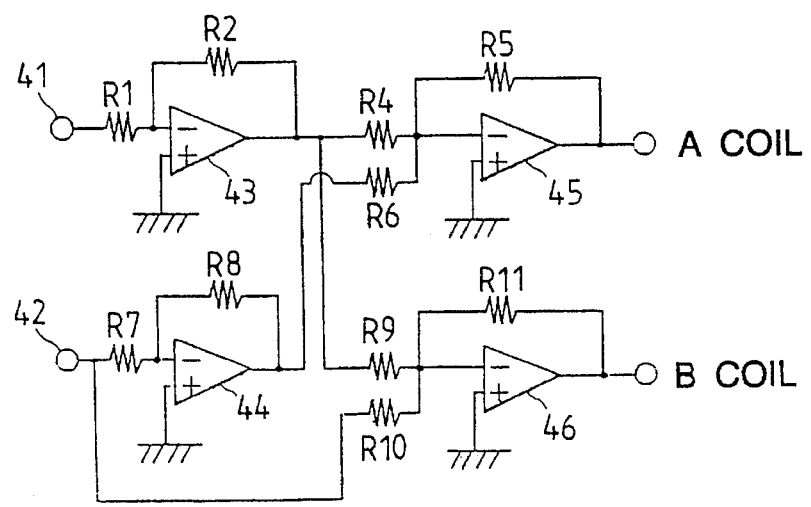
FIG. 4 is a circuit diagram showing an embodiment of an apparatus for supplying current to coils A and B of the embodiment shown in FIGS. 2A and 2B.

FIG. 4 is a circuit diagram showing one embodiment of an apparatus for supplying current to coils A and B. In FIG. 4, each of four amplifiers 43, 44, 45 and 46 has a negative input end as a signal input end and a positive end connected to ground. Reference symbols R1 through R11 are resistors which determine amplification factors of the respective amplifiers. An input 41 (focusing signal input) is connected to the negative input of amplifier 43, and another input 42 (tracking signal input) is connected to the negative input of amplifier 44.

The negative input of amplifier 45 is coupled to the outputs of amplifiers 43 and 44. The negative input of amplifier 46 is coupled to the output of amplifier 43 and tracking signal input 42.

The output of amplifier 45 is applied to coil A, and the output of amplifier 46 is applied to coil B. Hence, the circuit amplifies the currents applied at input ends 41 and 42 and outputs the amplified results. The circuit thus generates the currents for determining how far lens holder 10 is transferred in a tracking direction and/or a focusing direction based on the magnitudes and the polarity of the applied currents.

Lens holder 10 moves in a focusing direction and/or a tracking direction due to the currents applied to coils A and B from amplifiers 45 and 46, respectively. Magnetic forces influencing lens holder 10 are generated by the magnetic fields generated by permanent magnets 60 and 60', respectively. For exemplary purposes, movement of lens holder 10 caused by the magnetic field generated by permanent magnet 60' will be described below with reference to FIGS. 5A and 5B.

Figure 5A:
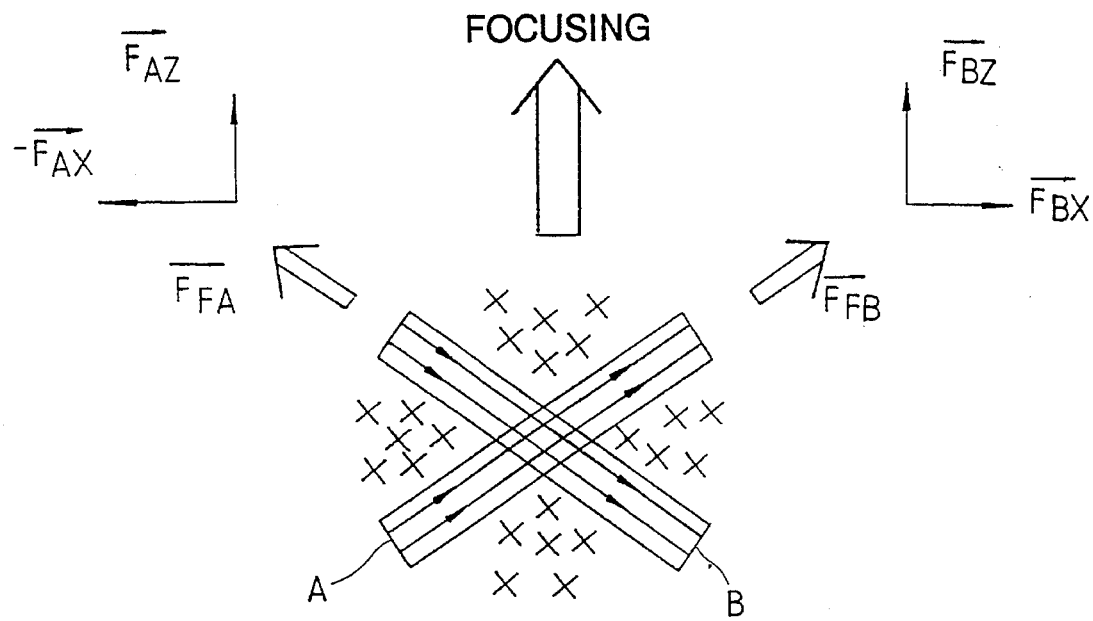
FIG. 5A shows a circuit diagram for explaining movement of lens holder 20 in a focusing direction as in the embodiment shown in FIGS. 2A and 2B.

FIG. 5A shows a circuit diagram for explaining movement of lens holder 10 in a focusing direction. Coils A and B are located within magnetic field −B which perpendicularly enters ground. A coordinate system, such as that defined in connection with FIG. 3, is used to explain the magnetic field directions. Thus, a Z-axis is a focusing direction and X-axis is a tracking direction.

When the respective currents as shown in FIG. 5A flow through coils A and B, a magnetic force $F_{FA}$ is generated having components $-F_{AX}$ and $F_{AZ}$ due to the current flowing through coil A and magnetic field $-B$. Also, a magnetic force $F_{FB}$ is generated having components $-F_{BX}$ and $F_{BZ}$ is generated due to the current flowing through coil B and magnetic field $-B$. When the currents flow through coils A and B simultaneously, as shown in FIG. 5A, a resultant force $F_{FOCUS}$ of $F_{FA}$ and $F_{FB}$ is represented as the following equation (1).

$$F_{FOCUS}=F_{FA}+F_{FB}=-F_{AX}+F_{AZ}+F_{BX}+F_{BZ}=F_{AZ}+F_{BZ} \qquad (1).$$

That is, $F_{FOCUS}$ becomes a force for transferring lens holder 10 in the Z-axis direction.

Figure 5B:
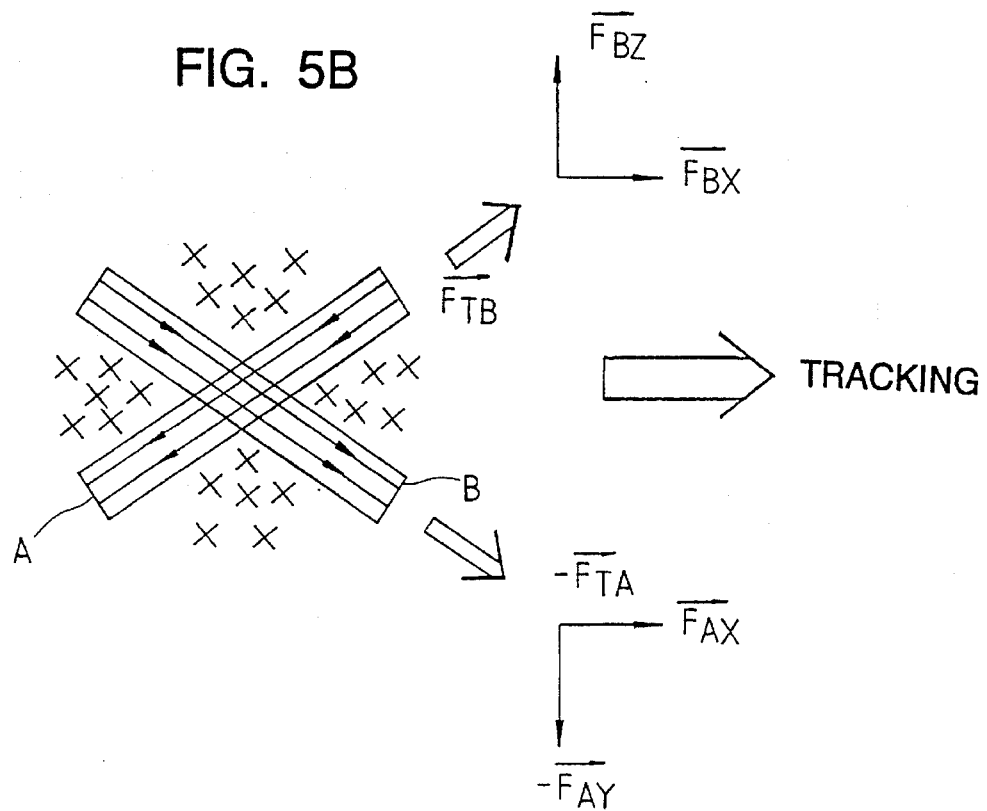
FIG. 5B shows a circuit diagram for explaining movement of lens holder 20 in a tracking direction as in the embodiment shown in FIGS. 2A and 2B.

FIG. 5B shows a circuit diagram for explaining movement of lens holder 10 in a tracking direction. To move lens holder 10 in the tracking direction, the direction of the current flowing through coil A is changed into the direction opposite to that shown in FIG. 5A. A magnetic force $F_{TA}$ having components $F_{AX}$ and $-F_{AZ}$ is generated due to the current flowing through coil A and magnetic field B. However, since the direction of the current flowing through coil B is not changed, a magnetic force $F_{TB}$ due to the current flowing through coil B has components $F_{BX}$ and $F_{BZ}$ as in the focusing operation.

When the current flows through coils A and B, as shown in FIG. 5B, a resultant force $F_{TRACKING}$ of $F_{TA}$ and $F_{TB}$ is calculated according to the following equation (2):

$$F_{TRACKING}=F_{TA}+F_{TB}=F_{AX}-F_{AZ}+F_{BX}+F_{BZ}=F_{AX}+F_{BX} \qquad (2).$$

Thus, when the focusing and tracking operations are simultaneously performed, a force applied to lens holder 10 is represented as a resultant force of $F_{FOCUS}$ and $F_{TRACKING}$.

$$F_{FOCUS}+F_{TRACKING}=F_{FA}+F_{FB}+F_{TA}+F_{TB}=F_{AZ}+F_{BZ}+F_{AX}+F_{BX}$$

However, when lens holder 10 moves simultaneously in the focusing and tracking directions, the current flows through only one coil of coil A and coil B. Here, the degree of movement of lens holder 10 in the focusing direction or the tracking direction is determined by magnitude and direction of the current applied to the corresponding coil. Since the procedure of the simultaneous focusing and tracking operation can be easily appreciated with reference to the above-described equations (1) and (2), the detailed descriptions thereof are omitted.

The objective lens 20 thus moves in the focusing direction and/or in the tracking direction due to the magnetic force generated by the magnetic field and the current. Lens holder 10 is returned to its original position by the force applied by elastic rods 32 when the currents do not flow through coils A and B.

Thus, the actuator for the optical unit according to the present invention improves the winding structures of the coils for tracking and focusing the objective lens or the optical pickup. Accordingly, the size of the actuator can be reduced, thereby resulting in decreased production costs.

While only certain embodiments of the invention have been specifically described herein, it will be apparent that numerous modifications may be made thereto without departing from the spirit and scope of the invention.

What is claimed is:

1. An actuator for an optical unit comprising:

a base plate;

a support member fixed to said base plate;

a lens holder, in which an objective lens is installed, having a recess in each of two surfaces substantially parallel to a photo axis of the objective lens and opposing each other;

elastic rods for supporting the objective lens with respect to said support member, and which are arranged to allow the objective lens to move in a tracking direction and a focusing direction;

a plurality of fixed coils for moving said lens holder in a tracking direction and a focusing direction, and which are fixedly wound about the surfaces of said lens holder in such a manner that an axis of each of the wound coils forms an acute angle with respect to the photo axis of the objective lens; and a magnetic field generator for generating magnetic fields which magnetically interlink portions of the plurality of the fixed coils which are spaced from the lens holder by the recesses.

2. An actuator for an optical unit according to claim 1, wherein said recesses space said portions of said fixed coils from said lens holder at a surface of said lens holder facing said support member and a surface of said lens holder opposite thereto.

3. An actuator for an optical unit according to claim 1, wherein said plurality fixed coils are wound around said lens holder in such a manner that individual planes formed by the portions of said coils passing over the recesses are located substantially perpendicular to a respective said magnetic field.

4. An actuator for an optical unit according to claim 3, wherein said magnetic field generator comprises:

a first magnetic field generation member for generating a magnetic field applied substantially perpendicularly to one plane formed by the portions of the coils which pass over one of the surfaces having a recess; and a second magnetic field generation member for generating a magnetic field applied substantially perpendicularly to the other plane formed by the portions of the coils which pass over the other of the surfaces having a recess;

wherein directions of the magnetic fields generated by said first and second magnetic field generator are opposite to each other.

5. An actuator for an optical unit according to claim 1, wherein said objective lens is moved in at least one of the tracking and focusing directions in cooperation with said plurality of the fixed coils and said magnetic field generator.

6. An actuator for an optical unit according to claim 5, further comprising a current generator for applying currents to said plurality of fixed coils to control said objective lens to move in the tracking direction or the focusing direction.

7. An actuator for an optical unit according to claim 6, wherein said objective lens moves simultaneously in the tracking and focusing directions due to the currents being applied to the coils.

8. An actuator for an optical unit comprising:

a base plate;

a support member fixed to said base plate;

a lens holder, in which an objective lens is installed, having a recess in each of two surfaces substantially parallel to a photo axis of the objective lens and opposing each other;

elastic rods for supporting the objective lens with respect to said support member, and which are arranged to allow the objective lens to move in a tracking direction and a focusing direction;

a plurality of fixed coils for moving said lens holder in a selected direction, and which are fixedly wound about the surfaces of said lens holder in such a manner that an axis of each of the wound coils forms an acute angle with respect to the photo axis of the objective lens, wherein the objective lens is disposed inside circumferences of said plurality of fixed coils; and a magnetic field generator for generating magnetic fields which magnetically interlink portions of the plurality of the fixed coils which are spaced from the lens holder by the recesses.

9. An actuator for an optical unit comprising:

a base plate;

a support member fixed to said base plate;

a lens holder, in which an objective lens is installed, having a recess in each of two surfaces substantially parallel to a photo axis of the objective lens and opposing each other;

elastic rods for supporting the objective lens with respect to said support member, and which are arranged to allow the objective lens to move in a tracking direction and a focusing direction;

a plurality of fixed coils for moving said lens holder in a selected direction, and which are fixedly wound about the surfaces of said lens holder in such a manner that an axis of each of the wound coils forms an acute angle with respect to the photo axis of the objective lens; and a magnetic field generator for generating magnetic fields which magnetically interlink portions of the plurality of the fixed coils which are spaced from the lens holder by the recesses, wherein said magnetic field generator comprises:

a first magnetic field generation member for generating a magnetic field applied substantially perpendicularly to one plane formed by the portions of the coils which pass over one of the surfaces having a recess; and a second magnetic field generation member for generating a magnetic field applied substantially perpendicularly to the other plane formed by the portions of the coils which pass over the other of the surfaces having a recess;

wherein directions of the magnetic fields generated by said first and second magnetic field generator are opposite to each other.

10. An actuator for an optical unit according to claim 8, wherein said recesses space said portions of said fixed coils from said lens holder at a surface of said lens holder facing said support member and a surface of said lens holder opposite thereto.

11. An actuator for an optical unit according to claim 8, wherein said plurality fixed coils are wound around said lens holder, in such a manner that individual planes formed by the portions of said coils passing over the recesses located are substantially perpendicular to a respective said magnetic field.

12. An actuator for an optical unit according to claim 11, wherein said magnetic field generator comprises:

a first magnetic field generation member for generating a magnetic field applied substantially perpendicularly to one plane formed by the portions of the coils which pass over one of the surfaces having a recess; and a second magnetic field generation member for generating a magnetic field applied substantially perpendicularly to the other plane formed by the portions of the coils which pass over the other of the surfaces having a recess;

wherein directions of the magnetic fields generated by said first and second magnetic field generator are opposite to each other.

13. An actuator for an optical unit according to claim 8, wherein said objective lens is moved in at least one of the tracking and focusing directions in cooperation with said plurality of the fixed coils and said magnetic field generator.

14. An actuator for an optical unit according to claim 13, further comprising a current generator for applying currents to said plurality of fixed coils to control said objective lens to move in the tracking direction or the focusing direction.

15. An actuator for an optical unit according to claim 14, wherein said objective lens moves simultaneously in the tracking and focusing directions due to the currents being applied to the coils.

16. An actuator for an optical unit according to claim 9, wherein said recesses space said portions of said fixed coils from said lens holder at a surface of said lens holder facing said support member and a surface of said lens holder opposite thereto.

17. An actuator for an optical unit according to claim 9, wherein said plurality fixed coils are wound around said lens holder, in such a manner that individual planes formed by the portions of said coils passing over the recesses located are substantially perpendicular to a respective said magnetic field.

18. An actuator for an optical unit according to claim 9, wherein said objective lens is moved in at least one of the tracking and focusing directions in cooperation with said plurality of the fixed coils and said magnetic field generator.

19. An actuator for an optical unit according to claim 18, further comprising a current generator for applying currents to said plurality of fixed coils to control said objective lens to move in the tracking direction or the focusing direction.

20. An actuator for an optical unit according to claim 19, wherein said objective lens moves simultaneously in the tracking and focusing directions due to the currents being applied to the coils.

* * * * *